Figure 1:
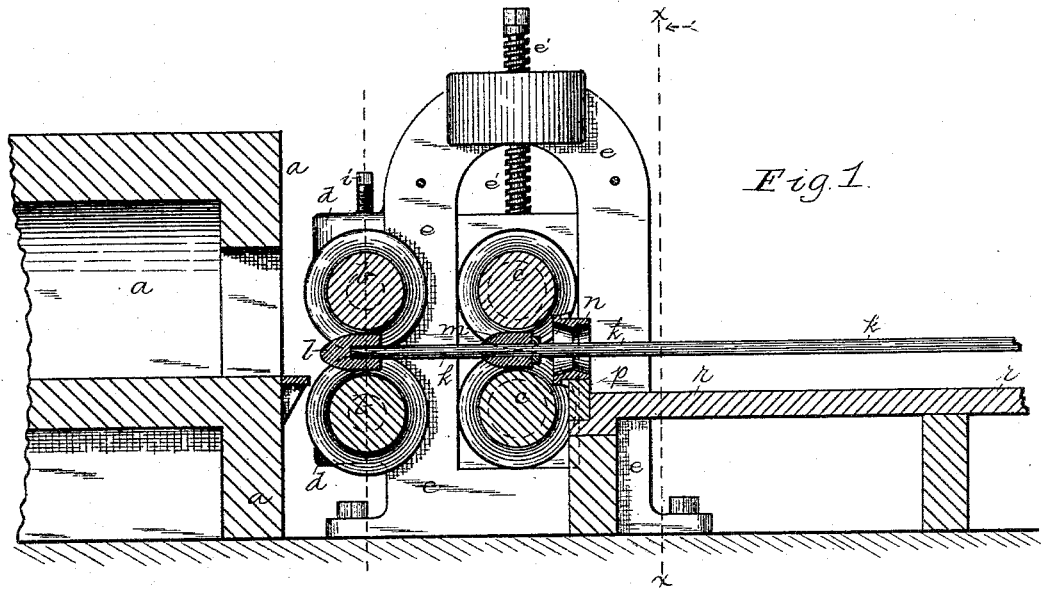

(No Model.)

J. H. FLAGLER.
APPARATUS FOR WELDING TUBING.

No. 401,146. Patented Apr. 9, 1889.

Witnesses:
J. A. Cooke
Robt. D. Totten

Inventor.
John H. Flagler
By James D. Ray
Attorney

UNITED STATES PATENT OFFICE.

JOHN H. FLAGLER, OF NEW YORK, N. Y.

APPARATUS FOR WELDING TUBING.

SPECIFICATION forming part of Letters Patent No. 401,146, dated April 9, 1889.

Application filed July 6, 1888. Serial No. 279,161. (No model.)

*To all whom it may concern:*

Be it known that I, JOHN H. FLAGLER, a resident of New York, in the county of New York and State of New York, have invented a new and useful Improvement in Apparatus for Welding Tubing; and I do hereby declare the following to be a full, clear, and exact description thereof.

My invention relates to apparatus for welding tubing, its object being to overcome certain difficulties heretofore experienced with the ordinary welding apparatus. It is well known that in welding tubing the ordinary apparatus comprises a furnace having its bed slightly inclined, so as to carry all the slag or scoria to the forward end of the furnace, or the end into which the skelp is entered, the skelp therefore being delivered from the other or rear end of the furnace at a slight upward incline, and at the discharge end of the furnace a pair of power-driven welding-rolls, these rolls consisting of two concave or grooved rolls mounted in suitable bearings and driven by suitable power, a welding-mandrel being supported within the grooved space between the rolls, and the rolls engaging with the skelp and pressing the same upon the mandrel, which acts as an anvil between the rolls, on which the overlapping edges of the skelp are welded by the pressure of the rolls, the welded tube passing backwardly from the rolls over the bar supporting the mandrel, which is subsequently withdrawn from the welded tube. In connection with this welding operation it is found that, for reasons not necessary to state, the welding apparatus is arranged on a horizontal plane, and as the bed of the furnace is slightly inclined, as above set forth, where the skelp is fed to the rolls it is necessarily given a slight bend, and for this and other reasons the entering end of the skelp is often left unwelded, the edges not being lapped properly for from four to eight inches from the entering end of the skelp, and thus forming imperfect ends on the tubing. One reason for this may arise from the fact that the welding-rolls are compelled to not only weld the tube, but to form the tube from the skelp—that is, to cause it to lap around the mandrel properly and bring the overlapping or scarfed edges in position to weld, and at the same time to bring the pressure upon said overlapping edges sufficient to weld together the same and form the welded tube. Appreciating the difficult work necessarily done by these single welding-rolls, attempts have been made to employ two sets of welding-rolls—one in front of the other—and to enter the skelp in the first set of rolls, which perform part of the welding operation, while the tube is passed therefrom to the second set of welding-rolls, which finish the welding and size the tube; but though many experiments have been tried in this direction this has been found impracticable, for the reason that the two rolls—namely, the first welding-rolls and the second welding or finishing rolls—both acted to draw the tube, and consequently the second pair of welding-rolls necessarily ran at a higher speed than the first pair to take up the amount of elongation of the metal of the tube occurring in the first set of rolls, and as the plate from which the tube was formed was not always of the same thickness the relative speed at which these two rolls were to be operated could not be positively determined, and it often occurred that the metal between the two rolls buckled on account of being fed too rapidly to the second set, while at other times it was stretched and weakened because not fed from the first set as rapidly as taken up by the second set, and for these reasons, as the two sets of rolls were not found to give any improvement to the manufacture of the welded tube, they were finally abandoned. These two sets of rolls did not insure the proper lapping and welding of the tube at the entrance end, as the heavy welding-pressure was brought upon the metal in the first set of rolls, which not only formed, but welded.

The principal object of my invention is to improve the construction of this tube-welding apparatus in such manner as to overcome the difficulties above referred to, and to obtain the lapping and welding of the tube close to or just at the entrance end thereof, so as to form a practically perfect tube for the entire length, and at the same time to relieve the welding-rolls from part of the labor to which they have usually been subject.

To these ends my invention consists, generally stated, in combining with the ordinary power-driven welding-rolls a pair of loosely-running forming and lapping rolls mounted in front of the welding-rolls, between them and the furnace, so that when the skelp is forced out of the furnace it will be first forced between these forming-rolls, which will bring it to shape, lap the edges, and cause the sticking of the edges, and then direct it, as it is forced through them, into the power-driven welding-rolls, these loosely-running rolls so acting to give the form to the tube, properly lap the edges thereof for the welding operation, and to cause said edges to adhere sufficiently to hold them in place when delivered to the welding-rolls. The invention also consists in combining with said loosely-running rolls a mandrel to enter within the blank and assist the loosely-running rolls to impart the desired form to the blank and cause the sticking of the overlapping edges.

My invention also consists in employing, in connection with the welding-rolls, a bell for sizing the pipe after the welding operation, the pipe being forced through the sizing-bell by the welding-rolls, and said bell acting to smooth the outer surface of the pipe and remove all scale therefrom, so imparting to the outer surface of the pipe a fine finish.

To enable others skilled in the art to make and use my invention, I will describe the same more fully, referring to the accompanying drawings, in which—

Figure 2:
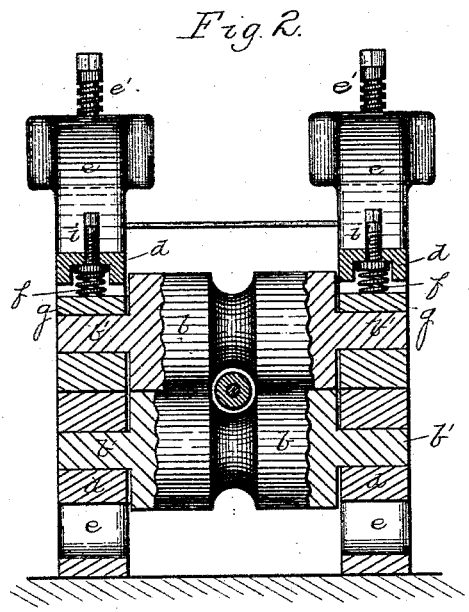
Figure 3:
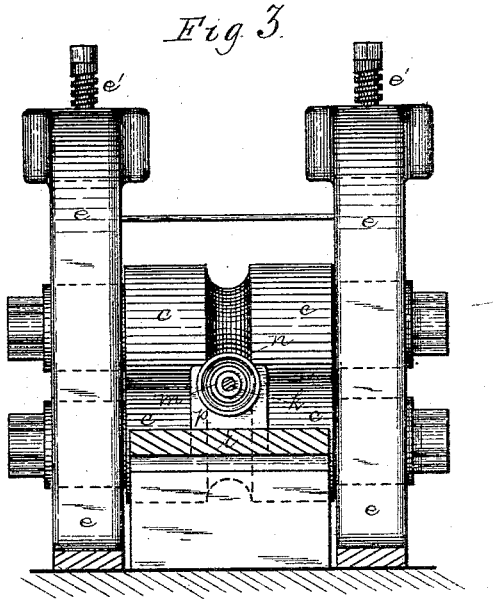

Figure 1 is a longitudinal central section of my improved apparatus. Fig. 2 is a cross-section of the front or loosely-running rolls, and Fig. 3 is a cross-section on the line $x\ x$ back of the welding-rolls.

Like letters of reference indicate like parts in each.

The furnace $a$ may be of any desired construction, said furnace being provided at its discharge end with any suitable guide to direct the tube blank or skelp from the furnace to the rolls. Mounted close to the mouth of the furnace and supported in any suitable housings or bearings are the loosely-running rolls $b\ b$, these rolls being the ordinary concave rolls and having the pass thereof corresponding to the pass of the welding-rolls $c\ c$, which are mounted behind them, so that the rolls $b\ b$ will form the tube to proper size for welding within the rolls $c\ c$. I prefer to support the rolls $b\ b$ on an extension, $d$, from the housing $e$ of the welding-rolls $c$, as by this arrangement a more compact apparatus can be obtained, the loosely-running rolls $b\ b$ being in such case mounted between the furnace and the welding-rolls, though the welding-rolls are not located any farther from the furnace than in the ordinary tube-welding apparatus.

The journals $b'$ (shown in Fig. 2) of the loosely-running rolls are, as will be noticed, formed of small diameter, the purpose being to reduce the friction so that these rolls can be easily caused to revolve by the pressure of the tube-skelp when fed through them, and as these rolls are not required to sustain any very great pressure the rolls may be made much lighter than the ordinary tube-welding rolls, the purpose being to employ said loosely-running rolls simply to form the tube or bring the tube-skelp to proper circular form for the welding operation to lap the edges and to press with sufficient force upon the overlapping or scarfed edges of the blank, to cause the same to adhere together until the blank is caught by the welding-rolls and the heavy pressure necessary to weld together said edges is imparted thereto. For the same purpose the pressure necessary for the forming of the blank, as above set forth, may be obtained by means of the springs $f$ in the bearings $g$ of the loosely-running rolls, the lower roll, $b$, being supported in a suitable box, while the upper roll runs in suitable bearing-blocks which are pressed down by the springs $f$, and the pressure of said springs regulated by the screws $i$. The welding-rolls $c\ c$ are mounted in the usual housings, $e$, and are of the usual construction, the rolls being held down under very heavy pressure by the screws $e'$, and the faces of said rolls $e\ e$ beyond the grooves therein bearing on each other, as is usual in such rolls. Supported in any suitable manner at the rear of the apparatus is the mandrel-bar $k$, which extends between said rolls $b\ b$ and $c\ c$, and between the welding-rolls $c\ c$ has the welding-mandrel $m$, while between the rolls $b\ b$, and supported at the forward end of said bar $k$, is the mandrel $l$, it being preferred by me that the forward mandrel, $l$, be a very little smaller than the welding-mandrel to prevent too great friction between the tube and the mandrel as it passes over the same. The first mandrel, $l$, between the rolls $b\ b$, acts as an anvil upon which the loosely-running rolls will press the overlapping edges of the skelp to stick the same together, while the mandrel $m$ receives the heavy pressure of the welding-rolls in the ordinary welding operation. Supported as close as possible to the welding-rolls $c\ c$, and in the line of the passage of the tube welded therein, is the sizing-bell or ring $n$, this bell being supported in a suitable bracket, $p$, secured to the housing $e$, or held at the forward end of the table $r$. The sizing-bell $n$ is of a diameter very slightly less than that of the welded tube to pass through the same, so that it fits closely to said tube and acts to scrape therefrom any scale adhering to the tube, and also acts to press slightly upon the body of the tube, and while it is at the high heat necessary for the welding operation to skin or press on the surface thereof, and so impart a fine finish to the surface of the welded tube, and the bell practically polishing the surface thereof. The welding-balls $l\ m$ can pass through this sizing-bell $n$, so that it does not interfere to any extent with the operation of the apparatus, and as the sizing-bell $n$ drops into the bracket $p$ it can be removed or changed at pleasure.

In employing my improved apparatus for the manufacture of tubing the proper welding balls or mandrels $l\ m$ are secured on the mandrel-bar $k$ and pass out between the rolls, the sizing-bell $n$ being secured in its bracket $p$ and the rolls being properly adjusted. The welder at the front end of the welding-furnace $a$ then brings the skelp which is to be welded into proper position in front of the discharge-spout of the furnace, ready for the welding operation, and when at the proper heat by means of suitable pushing apparatus—such as is generally employed in connection with the welding-furnace—the welder and his helpers push the skelp out of the forward end of the furnace, the skelp while at a very high welding heat coming in contact with the rolls $b$ $b$, and being pushed through said rolls until it enters the welding-rolls $c$ $c$, by which it is drawn out of the furnace. In passing through the loosely-running rolls $b$ $b$ these rolls bring the skelp to proper shape and bend it around the mandrel $l$, bringing the lapping or scarfed edges into proper position for welding, and at the same time, as there is a light pressure exerted by said rolls, either by the weight of the upper roll or by the springs $f$ operating on the journals thereof, the lapping edges of the skelp are caused to stick together sufficiently to hold until the pipe enters the power-driven welding-rolls $c$ $c$, and as the edges of the blank or skelp are simply stuck together and no very heavy pressure brought upon them while the blank is being brought to proper tubular shape or form, the edges of the blank can be united close to the forward end thereof, and the liability of the formation of an imperfect end to the tube is practically overcome, though even if the lapping edges of the blank should not be stuck at the forward end in passing through the loosely-running rolls. As the blank enters the regular welding-rolls in substantially the proper tubular form, and the principal work accomplished by said rolls is the welding of the blank, it is evident that if the forward edges of the blank are not properly stuck they are at least properly lapped in the loosely-running rolls, and are therefore in position to be welded in the welding-rolls $c$ $c$, and all liability of the formation of an imperfect portion at the forward end of the weld is overcome. As the tube is caught by the welding-rolls $c$ $c$, it is welded and drawn by said rolls around the welding mandrel or ball $m$, and a much more perfect tube is obtained because a proper tubular blank is fed to the welding-rolls, while at the same time all liability of the buckling of the metal or the stretching of the metal between the two pairs of rolls is entirely overcome, as only one set are power-driven, so that I am enabled to obtain all the advantages of bringing the blank to proper tubular form and the sticking or uniting of the edges thereof before the welding operation, without any of the disadvantages found as above set forth in the ordinary power-driven rolls. As the blank is forced by the welding-rolls $c$ $c$ over the mandrel $m$, it is forced out through the sizing or finishing bell $n$, and as it is forced through said bell all scale or oxide adhering thereto is scraped off by the bell, and, further than that, the bell, by binding slightly on the surface of the pipe, acts to size or finish the outer surface in substantially the same manner as the welding-ball $m$ does in the interior of the tube, the sizing or finishing bell thus enabling me to obtain a fine polish or finish on the outer surface of the tube, which has not heretofore been obtained in the ordinary manner of making tubing. As the finishing-bell $n$ is placed close to the welding-rolls, as shown, the motion imparted to the tube during the welding operation generally is sufficient to force the rear end of the tube through the bell under ordinary circumstances; but if there is not sufficient impetus imparted to the tube for this purpose, by means of suitable power-driven or hand-operated tongs, the end of the pipe can be easily drawn out from the bell.

By my improved apparatus I am thus enabled to obtain all the advantages of two sets of rolls in the welding of the tubing and to overcome the great objection to the use of such rolls, while at the same time I am enabled to present to the welding-rolls a blank which is of substantially the proper shape for welding and which is properly lapped and has the edges thereof stuck or united to be received and properly welded by the rolls. As the loosely-running welding-rolls can be placed close to the furnace, and in the space usually left between the welding-rolls and the furnace, it is evident that in my apparatus the labor of the welders is but very little increased, as the rolls $b$ $b$ run with but little friction, and it is not necessary that the tube be forced with much greater force by the operators than before.

What I claim as my invention, and desire to secure by Letters Patent, is—

1. In tube-welding apparatus, the combination, with the welding-furnace and power-driven tube-welding rolls, of a set of concave forming and lapping rolls mounted loosely in bearings between the furnace and the welding-rolls, and adapted to form the tube and lap the edges to be welded prior to its entrance into the welding-rolls, substantially as and for the purposes set forth.

2. In tube-welding apparatus, the combination, with a welding-furnace and power-driven tube-welding rolls, of a set of loosely-running rolls between the furnace and welding-rolls, and a mandrel or ball in the pass between said loosely-running rolls, substantially as and for the purposes set forth.

3. In tube-welding apparatus, the combination, with a welding-furnace and power-driven tube-welding rolls, of loosely-mounted rolls located between the furnace and welding-rolls, and springs governing the pressure of said loosely-running rolls, substantially as and for the purposes set forth.

4. In tube-welding apparatus, the combination, with tube-welding rolls, of a sizing or finishing bell located back of the same and in the line of the passage of the tube from said welding-rolls, substantially as and for the purposes set forth.

5. In apparatus for welding tubes, the combination, with the tube-welding rolls $c\ c$, of the bracket $p$ and the sizing or finishing bell $n$, supported by said bracket, substantially as and for the purposes set forth.

In testimony whereof I, the said JOHN H. FLAGLER, have hereunto set my hand.

JOHN H. FLAGLER.

Witnesses:
  JAMES I. KAY,
  ROBT. D. TOTTEN.